(No Model.)
C. B. MERRITT.
TRUCK.
No. 551,983. Patented Dec. 24, 1895.
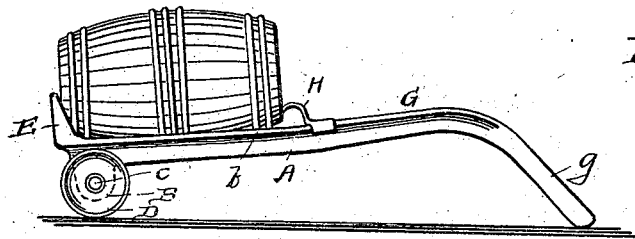
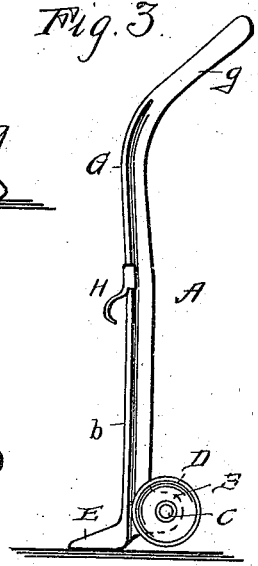
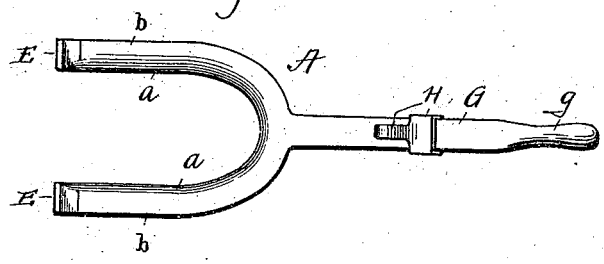
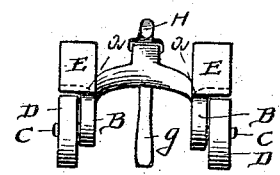
WITNESSES
Geo. M. Anderson
Philip C. Masi
INVENTOR
Chas B. Merritt
J. E. W. Anderson
Attorney

UNITED STATES PATENT OFFICE.

CHARLES B. MERRITT, OF GOUVERNEUR, NEW YORK.

TRUCK.

SPECIFICATION forming part of Letters Patent No. 551,983, dated December 24, 1895.

Application filed June 11, 1895. Serial No. 552,481. (No model.)

*To all whom it may concern:*

Be it known that I, CHARLES B. MERRITT, a citizen of the United States, and a resident of Gouverneur, in the county of St. Lawrence and State of New York, have invented certain new and useful Improvements in Trucks; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a side elevation of the invention, showing barrel thereon. Fig. 2 is a plan view of same, barrel removed and dog shoved back. Fig. 3 is a side elevation of truck raised on end. Fig. 4 is a front view of truck when lowered.

The object of this invention is to provide a two-wheeled barrel, box, or bag truck which is more simple in its construction, cheaper to manufacture, and lighter to handle than any two-wheeled truck now on the market.

With this object in view the invention consists in the novel construction and combination of parts, all as hereinafter described, and pointed out in the appended claims.

The invention more particularly consists in a truck, the handle, frame, and axle or journals of which are formed in one piece of steel, wrought or malleable iron, of L or T form in cross-section.

Referring to the accompanying drawings, the letter A designates the frame, which is forked, as indicated, the fork being open at the front and of U form. At the forward end portion of each fork is a depending lug B, which is provided with an axle stud or journal C for a wheel D. Each fork has also an upward lug E at its forward end, these lugs being for the purpose of holding the barrel or other object placed on the truck from sliding endwise therefrom. The inner portions of the forks are beveled or chamfered, as indicated at *a a*, to form a seat for a barrel or the like. It will be observed that the flanges *b*, formed by the L or T form of the frame, act as guards over the wheels D.

G designates the integral handle portion of the frame, whose rear portion is bent downwardly, as indicated at *g*, to form a support for the truck when at rest.

The lugs E are thrown forward to such an extent that when the truck is stood on end, as in Fig. 3, to receive a barrel, the wheels D stand clear of the floor or surface. As the truck is brought down upon the wheels with the barrel upon it, this feature gives an effective leverage upon the barrel.

H is a dog which is arranged to slide on the handle portion G, said dog having a nose or hook *h*, adapted to engage the chine of a barrel.

The truck is perfectly self-balancing, and while light and easy to handle is extremely strong and durable.

Having thus described my invention, what I claim as new, and desire to secure by Letters Patent, is—

1. The herein described improved barrel truck, having a frame formed at one end portion with a U-shaped fork adapted to seat a barrel or the like, and having depending bearings for the wheels, the opposite end portion of said frame forming a single downwardly bent handle bar, the entire frame being formed of an integral piece of metal angular in its cross section, substantially as specified.

2. The herein described truck, consisting of a forked frame arranged to seat a barrel or the like, the arms of the fork having at their forward portions, depending lugs provided with bearing studs, the wheels, and upward guards, and a handle portion bent downwardly at its rear end to form a support for the truck when at rest, said frame, handle portion and wheel bearings being formed from one piece of metal, substantially as specified.

3. The herein described truck, comprising the forked frame, having the guard lugs E, the depending lugs C having bearing studs for the wheels, and the bent handle portion G, said parts being formed from one piece of metal of angular cross-section, the wheels, and the dog arranged to slide on said handle portion, the flanges of said frame forming overguards for said wheels, substantially as specified.

In testimony whereof I affix my signature in presence of two witnesses.

CHAS. B. MERRITT.

Witnesses:
FRED B. FULLER,
G. H. SUMMERFEATH.